(12) United States Patent
Dotz et al.

(10) Patent No.: US 11,283,310 B2
(45) Date of Patent: Mar. 22, 2022

(54) STATOR, ELECTRIC MACHINE, VEHICLE, AND METHOD FOR PRODUCING A STATOR

(71) Applicant: VALEO SIEMENS EAUTOMOTIVE GERMANY GMBH, Erlangen (DE)

(72) Inventors: Boris Dotz, Munich (DE); Sebastian Waider, Petersberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/906,005

(22) Filed: Jun. 19, 2020

(65) Prior Publication Data
US 2020/0403461 A1  Dec. 24, 2020

(30) Foreign Application Priority Data
Jun. 21, 2019  (DE) ............... 10 2019 116 822.8

(51) Int. Cl.
*H02K 1/16* (2006.01)
*H02K 1/18* (2006.01)
*H02K 1/20* (2006.01)
*H02K 5/12* (2006.01)
*H02K 15/02* (2006.01)

(52) U.S. Cl.
CPC ............ *H02K 1/165* (2013.01); *H02K 1/18* (2013.01); *H02K 1/20* (2013.01); *H02K 5/12* (2013.01); *H02K 15/024* (2013.01)

(58) Field of Classification Search
CPC .................................... H02K 9/19; H02K 1/14
USPC ............... 310/52, 57, 58, 216.004, 216.044, 310/216.049
See application file for complete search history.

(56) References Cited

U.S. PATENT DOCUMENTS 3,663,848 A * 5/1972 Lehoczky ............ H02K 19/20
                                                 310/90
6,020,667 A   2/2000 Carey et al.
(Continued)

FOREIGN PATENT DOCUMENTS

JP    2008-312292 A   12/2008
WO    2007/107131 A1   9/2007

OTHER PUBLICATIONS

Baehr, Hands Dieter; Stephan, Karl: Wärme-und Stoffübertragung, 9., updated edition, Berlin: Springer, 2016 Cover page +contents list + p. 38.

*Primary Examiner* — Jose A Gonzalez Quinones
(74) *Attorney, Agent, or Firm* — Manabu Kanesaka

(57) ABSTRACT

The invention relates to a stator, an electric machine comprising the stator, a vehicle comprising the electric machine, and a method for producing the stator. The stator comprises a stator laminated core and a housing element. The stator laminated core comprises a plurality of layered stator laminations, wherein each stator lamination has a plurality of tooth portions, each formed radially inwardly at an angular position, and indentations radially outwardly at each of the angular positions, each of which indentations has an at least partially curved edge having two radially outwardly curved edge portions, which meet at a point of intersection and describe an arc of a circle segment. The housing element comprises a cylindrical inner volume, in which the stator laminated core is arranged, the indentations forming cooling channels.

12 Claims, 3 Drawing Sheets

(56) References Cited

U.S. PATENT DOCUMENTS

Figure 1:
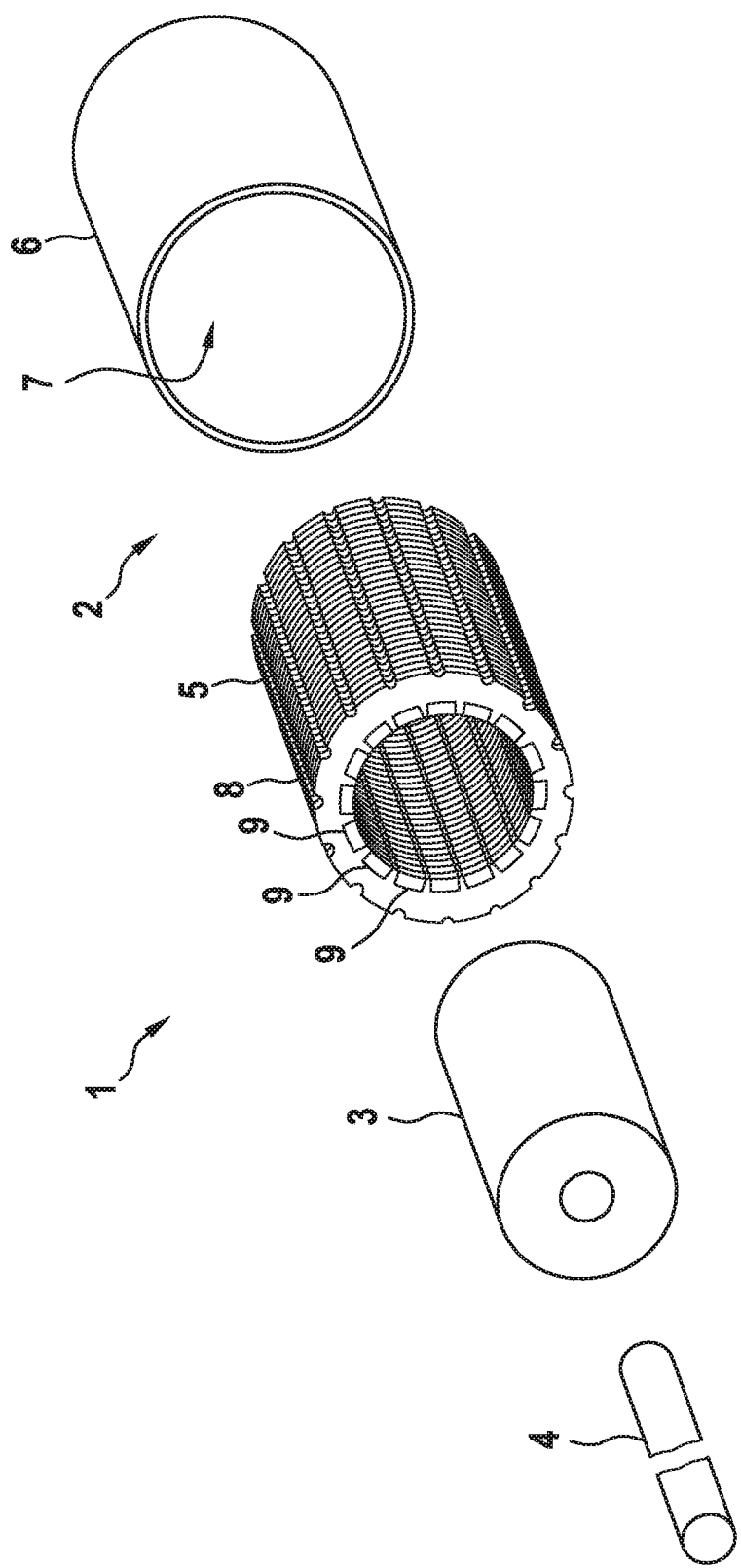

| | | | | |
|---|---|---|---|---|
| 2004/0119367 A1* | 6/2004 | Hiwaki | ................ | H02K 1/185 |
| | | | | 310/254.1 |
| 2010/0007236 A1* | 1/2010 | Sano | ................ | H02K 1/148 |
| | | | | 310/216.135 |
| 2016/0308416 A1* | 10/2016 | Azusawa | ................ | H02K 3/345 |
| 2017/0338724 A1* | 11/2017 | Arakawa | ................ | H02K 1/146 |
| 2017/0358961 A1 | 12/2017 | Kitamura et al. | | |

\* cited by examiner

STATOR, ELECTRIC MACHINE, VEHICLE, AND METHOD FOR PRODUCING A STATOR

RELATED APPLICATIONS

The present application is based on, and claims priority from, German Application No. DE 10 2019 116 822.8 filed Jun. 21, 2019, the disclosure of which is hereby incorporated by reference herein in its entirety.

The present invention relates to a stator, n electric machine, a vehicle, and a method for producing a stator.

When electric machines are operated, current heat losses and hysteresis losses produce heat in the laminated core of the stator of the electric machine, which core is formed from stator laminations. So as not to exceed a maximum permissible temperature in the stator, it has already been proposed to provide a cooling jacket for liquid cooling of the stator, which cooling jacket can be used to dissipate heat through the stator laminated core.

The object of the invention is to describe a way of cooling a stator that can be easily manufactured and is also favourable in respect of its electromagnetic properties.

This object is achieved in accordance with the invention in a stator core of the kind described at the outset by providing indentations in the stator core radially outwardly at angular positions, each of which indentations has an at least partially curved edge.

The object of the invention is achieved in particular by a stator having: a stator laminated core which has a plurality of layered stator laminations, wherein each stator lamination has a plurality of tooth portions, each formed radially inwardly at an angular position, and indentations radially outwardly at each of the angular positions; each of which indentations has an at least partially curved edge having two radially outwardly curved edge portions, which meet at a point of intersection and describe an arc of a circle segment; and a housing element with a cylindrical inner volume, in which the stator laminated core is arranged, the indentations forming cooling channels.

The invention is based on the consideration that magnetic flux caused by stator windings is relatively low at the angular positions where the tooth portions are formed radially inwardly, and therefore the formation of the radially outer indentation has only a slight influence on the electromagnetic behaviour. The at least partially curved design of the edge of the indentation additionally follows the curved profile of the magnetic field lines, and the geometry of the indentation thus matches this profile superbly. Cooling channels for a liquid cooling of a stator laminated core assembled from the stator laminations may be formed by the indentations. Due to the easily manufacturable form of the indentations, the stator core according to the invention advantageously enables a significant improvement of the operating behaviour of a stator formed by means of the stator laminations.

The tooth portions are typically formed by making grooves in the stator lamination radially inwardly between the angular positions. The stator lamination is preferably formed from a soft iron material. The stator lamination typically has a circular basic shape.

In accordance with a first advantageous embodiment it is provided that the edge has two radially outwardly curved edge portions that meet at a point of intersection and in particular each describe an arc of a circle sector. This design of the edge follows the approximately coaxial course of the magnetic field lines around the grooves particularly well.

In accordance with a second embodiment of the stator lamination according to the invention, it is provided that the edge is curved radially inwardly, in particular describing an arc of a circle sector. This design of the edge is also well matched to the course of the magnetic field lines.

In order to increase the area of contact between the stator lamination and a cooling fluid passing through the indentation, it may be provided that elevations are formed within the indentation.

It is particularly advantageous from a manufacturing viewpoint if the edge is delimited on one side in the circumferential direction or on each side in the circumferential direction by a protrusion which protrudes beyond a circular basic shape of the stator lamination. The protrusions in particular taper off to their radially outermost point. As a result of the protrusion, the stator lamination may cut into the housing element when the it is inserted into the housing element and may thus secure the stator lamination to the housing element or prevent the stator lamination from rotating within the housing element. During this cutting process, displaced material of the housing element additionally collects advantageously in the indentation.

A further aspect of the invention relates to a stator laminated core comprising a plurality of layered stator laminations according to the invention.

In this case, a straight stator laminated core may be produced as a result of the tooth portions being aligned in the axial direction. Alternatively, a slanted stator laminated core may also be produced as a result of adjacent stator laminations being arranged offset by an angle.

The stator according to the invention comprises this stator laminated core in particular.

The stator according to the invention also preferably comprises a housing element with a cylindrical inner volume in which the stator laminated core is arranged.

With regard to the cutting of the protrusions into the housing element, it is preferred if the protrusion protrudes into the housing element.

The housing element is preferably formed from a softer material than the material of the stator laminations. The material of the housing element may be aluminium.

In particular with regard to the first embodiment of the stator lamination according to the invention, it is preferred if the point of intersection is covered radially outwardly by a sealant.

The problem addressed by the invention is also solved by an electric machine comprising a stator according to the invention and a rotor arranged within the stator.

In addition, the problem addressed by the invention is solved by a vehicle comprising an electric machine according to the invention, which electric machine is designed to drive the vehicle. The vehicle may be configured as an electric vehicle (BEV) or as a hybrid vehicle.

The problem addressed by the invention is also solved by a method for producing a stator for an electric machine, comprising the following steps: providing a stator laminated core having a plurality of layered stator laminations, the stator laminations each having a plurality of tooth portions, each formed radially inwardly at an angular position, and indentations each arranged radially outwardly at the angular positions and having an at least partially curved edge; providing a housing element having a cylindrical inner volume; and inserting the stator laminated core into the housing element such that cooling channels are formed by the indentations and an inner face of the housing element.

It can be provided in this case that stator laminations are used in which the edge is delimited on one side in the circumferential direction or on each side in the circumferential direction by a protrusion which protrudes beyond a cylindrical basic shape of the stator laminated core; each protrusion cutting into the inner face of the housing element as the stator laminated core is inserted.

All embodiments relating to the stator lamination can be transferred similarly to the stator according to the invention, the electric machine according to the invention, the vehicle according to the invention and the method according to the invention, and therefore the aforementioned advantages may be achieved with them as well.

Figure 2:
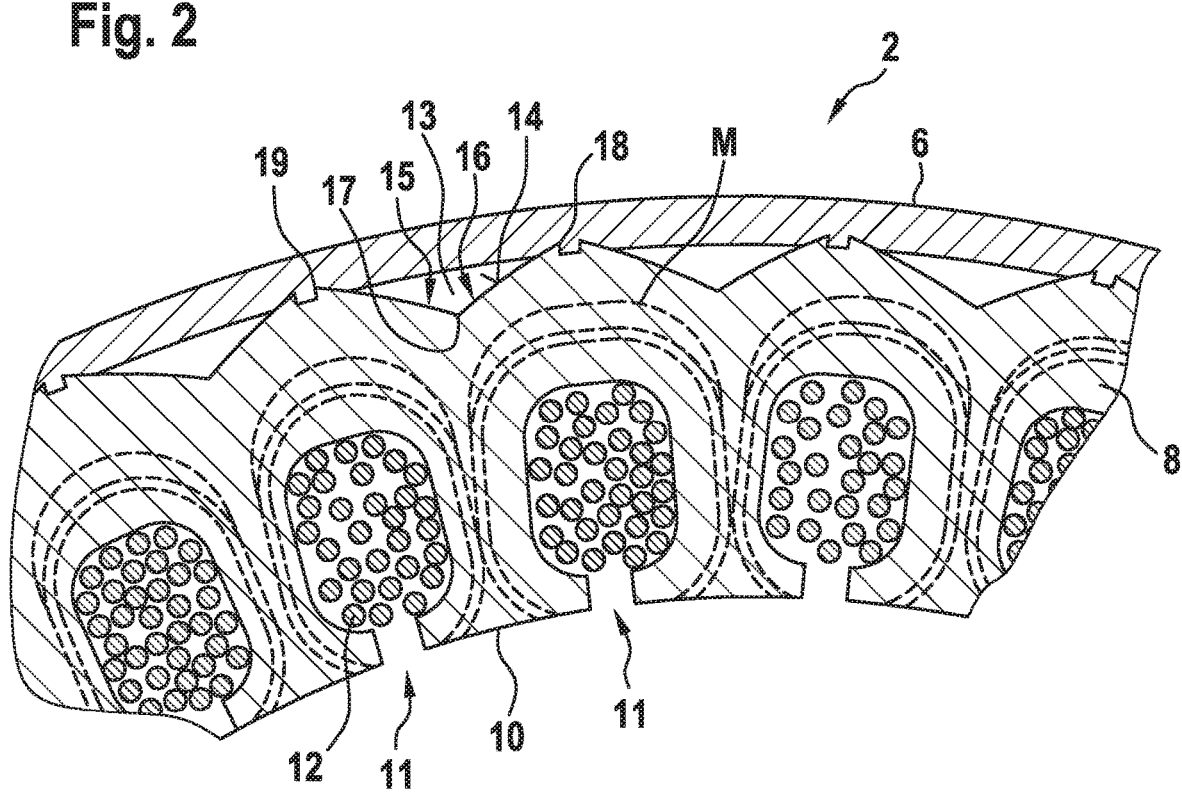
Figure 3:
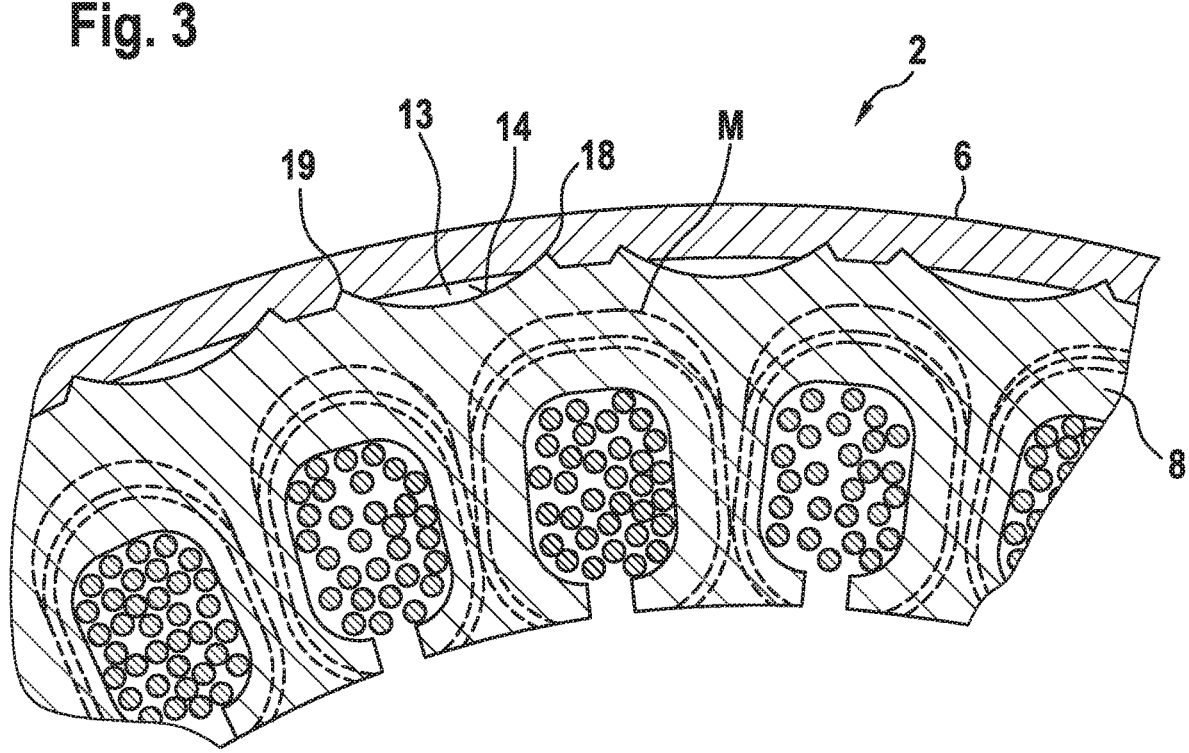
Figure 4:
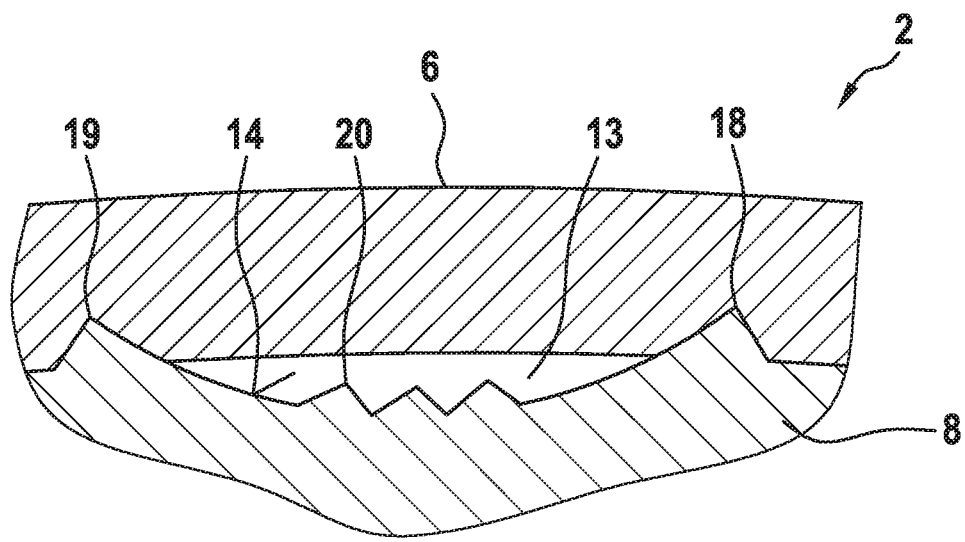

Further advantages and details of the present invention will become clear from the exemplary embodiments described hereinafter and with reference to the drawings, which are schematic illustrations and show:

FIG. 1 an exploded illustration of an electric machine;

FIG. 2 a sectional detail of a stator of the electric machine;

FIG. 3 a sectional detail of an alternative stator of the electric machine;

FIG. 4 a sectional detail of a further stator of the electric machine; and

Figure 5:
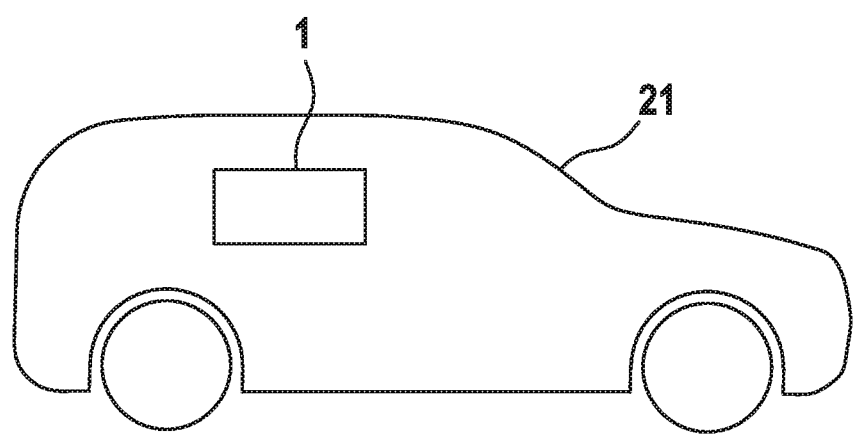

FIG. 5 a basic diagram of a vehicle which comprises the electric machine.

FIG. 1 shows an exploded illustration of an electric machine 1, comprising a stator 2, in which a rotor 3 and a shaft 4 connected thereto for conjoint rotation are mounted.

The stator 2 comprises a stator laminated core 5 and a housing element 6 having a cylindrical inner volume 7, in which the stator laminated core 5 is arranged. The stator laminated core 5 is formed from a plurality of layered stator laminations 8. In addition, a plurality of winding heads 9 of the stator 2, which are arranged at the end face, are shown. In the present exemplary embodiment the stator laminations 8 are formed from a soft iron material and the housing element is formed from aluminium.

FIG. 2 shows a sectional detail of the stator 2.

Each stator lamination 8 comprises a plurality of tooth portions 10 formed radially at an angular position. The tooth portions 10 are each formed by adjacent grooves 11, Stator windings 12 of the stator 2 are arranged within the grooves 11 and form the winding heads 9.

Radially outwardly, the stator lamination 8 has indentations 13 at each angular position. An edge 14 of the indentation 13 comprises a first edge portion 15 and a second edge portion 16, which are each curved radially outwardly and meet at a point of intersection 17. The point of intersection 17 is situated at the angular position where the centre of the tooth portion 10 is also situated, as considered along the circumferential direction. The edge portions 15, 16 each describe an arc of a circle sector, preferably with an identical radius. A sealant may be applied to the stator laminated core 5 along the points of intersection 17 of the individual stator laminations 8.

The indentations 13, as a result of this form, may be matched in particular superbly to the profile of magnetic field lines M. Consequently, the indentations occupy only particularly low-flux areas of the stator lamination 8, and thus have only a very small influence on the electromagnetic behaviour of the stator 2.

The indentations 13 are fully closed by the housing element 6, such that cooling channels of the stator 2 through which a cooling fluid can pass and which extend in the axial direction are formed.

The edge 14 is delimited on both sides in the circumferential direction by a protrusion 18, 19, which extends beyond the circular basic shape of the stator lamination 8 and protrudes into the housing element 8. As the stator laminated core 5 (see FIG. 1) is inserted into the housing element 6, the protrusions 18, 19 cut into the softer material of the housing element 6 and thus secure the stator laminated core 5 within the housing element 6. Material sheared off during this cutting process may advantageously collect in the indentations and may be easily removed.

FIG. 3 shows a sectional detail of an alternative embodiment of the stator 2 with further exemplary embodiments of the stator laminated core 5 and the stator lamination 8. The exemplary embodiments differ from the previously described exemplary embodiments in that the edge 14 of the indentation 13 is curved radially inwardly and describes an arc of a circle segment. With this form of the indentations 13 as well, only low-flux areas of the stator lamination 8 are used to form the cooling channels.

FIG. 4 shows a sectional detail of a further exemplary embodiment of the stator 2 with further exemplary embodiments of the stator laminated core 5 and the stator lamination 8, which correspond to the exemplary embodiments according to FIG. 3. In these exemplary embodiments the indentations 13 have additional elevations 20, such that the edge 14 is only partially curved. In accordance with further exemplary embodiments, the elevations 20 may also be formed in the indentations 13 in accordance with FIG. 2.

In accordance with a further exemplary embodiment of the stator laminated core 5, which additionally corresponds to the stator laminated core 5 of one of the previously described exemplary embodiments of the stator 2, the stator laminations 8 are each arranged in layers offset by an angle, such that a slanted laminated core is formed.

FIG. 5 shows a basic diagram of a vehicle 21, for example an electric vehicle (BEV) or a hybrid vehicle. The vehicle 21 has an electric machine 1 according to one of the previously described exemplary embodiments which is configured to drive the vehicle 21.

The invention claimed is:

1. A stator, comprising:
a stator laminated core including a plurality of layered stator laminations, each of the plurality of layered stator laminations including
a plurality of tooth portions, each of the plurality of tooth portions being formed radially inwardly at each of angular positions, and
indentations forming cooling channels, each of the indentations being formed radially outwardly at each of the angular positions and having at least a partially curved edge formed with two radially outwardly curved edge portions which meet at a point of intersection and describe an arc of a circle segment; and
a housing element having a cylindrical inner volume, in which the stator laminated core is arranged.

2. The stator according to claim 1, wherein each of the indentations includes at least one elevation.

3. The stator according to claim 1, wherein the edge is delimited on one side in a circumferential direction or on each side in the circumferential direction by a protrusion which protrudes beyond a circular basic shape of each of the stator laminations.

4. The stator according to claim 3, wherein the protrusion protrudes into the housing element.

5. An electric machine, comprising:
the stator according to claim 1, and
a rotor arranged within the stator.

6. A vehicle, comprising:
the electric machine according to claim 5 which is configured to drive the vehicle.

7. A method for producing the stator according to claim 1, comprising:
    inserting the stator laminated core into the housing element such that cooling channels are formed by the indentations and an inner face of the housing element.

8. The method according to claim 7, wherein each of the plurality of stator laminations is arranged such that the edge is delimited on one side in a circumferential direction or on each side in the circumferential direction by a protrusion which protrudes beyond a cylindrical basic shape of the stator laminated core, each protrusion cutting into the inner face of the housing element as the stator laminated core is inserted.

9. The stator according to claim 4, wherein each of the plurality of stator laminations is cut into the housing element and is secured to the housing element or is prevented from rotating within the housing element.

10. The stator according to claim 3, wherein the protrusion tapers off to a radially outermost point thereof.

11. The stator according to claim 1, further comprising stator windings around which a magnetic field is generated,
    wherein the stator laminated core further includes a plurality of grooves adjacent to each other in which the stator windings are arranged, respectively, and
    the two radially outwardly curved edge portions are curved to protrude toward the housing element in a radial direction of each of the plurality of layered stator laminations adapted to match a profile of the magnetic field.

12. The stator according to claim 11, wherein the at least a partially curved edge includes protrusions protruding into the housing element at two side of the at least a partially curved edge in a circumferential direction thereof, and the two radially outwardly curved edge portions are curved close to each other toward the point of intersection from each of the protrusions.

\* \* \* \* \*